(12) United States Patent
Popovich et al.

(10) Patent No.: US 6,525,847 B2
(45) Date of Patent: Feb. 25, 2003

(54) THREE DIMENSIONAL PROJECTION SYSTEMS BASED ON SWITCHABLE HOLOGRAPHIC OPTICS

(75) Inventors: Milan M. Popovich, Leicester (GB); Jonathan D. Waldern, Los Altos Hills, CA (US)

(73) Assignee: DigiLens, Inc., Sunnyvale, CA (US)

( * ) Notice: Subject to any disclaimer, the term of this patent is extended or adjusted under 35 U.S.C. 154(b) by 63 days.

(21) Appl. No.: 09/768,088

(22) Filed: Jan. 23, 2001

(65) Prior Publication Data

US 2001/0013960 A1 Aug. 16, 2001

Related U.S. Application Data

(63) Continuation-in-part of application No. 09/334,286, filed on Jun. 16, 1999, now abandoned.

(51) Int. Cl.[7] ............................................... G02B 5/32
(52) U.S. Cl. ............................. 359/15; 359/22; 359/24; 359/32; 359/462; 359/464; 359/472; 348/51; 353/7
(58) Field of Search ............................. 359/15, 22, 23, 359/32, 33, 472, 464, 462; 353/7; 348/51

(56) References Cited

U.S. PATENT DOCUMENTS

| 4,500,163 A | 2/1985 | Burns et al. ................... 350/3.7 |
| 4,834,476 A | 5/1989 | Benton ....................... 350/3.76 |

(List continued on next page.)

FOREIGN PATENT DOCUMENTS

| EP | 0785457 A2 | * 7/1997 |
| EP | 0785457 A | 7/1997 |

(List continued on next page.)

OTHER PUBLICATIONS

Bunning, T.J. et al., "The Morphology and Performance of Holographic Transmission Gratings Recorded in Polymer Dispersed Liquid Crystals," Polymer vol. 36, No. 14, received Dec. 27, 1994; revised Feb. 10, 1995, pp. 2699–2708.

Domash, Lawrence H. et al., "Applications of Switchable Polaroid Holograms," SPIE vol. 2152, Jun. 1, 1994, pp. 127–138.

(List continued on next page.)

Primary Examiner—Cassandra Spyrou
Assistant Examiner—Leo Boutsikaris
(74) Attorney, Agent, or Firm—Campbell Stephenson Ascolese LLP

(57) ABSTRACT

Switchable holographic optical elements (HOEs) can used in systems and methods for projecting three-dimensional images, or for projecting two-dimensional tiled images with increased size and/or resolution. One of the methods may include sequentially displaying first, second, and third color components of a first two-dimensional image at an object plane. The first two dimensional image represents a first slice of a three-dimensional image. As the first, second, and third color components are displayed, first, second and third HOEs may be activated so that the activated first switchable HOE focuses the first color component of the first two-dimensional image onto a first image plane, the activated second switchable HOE focuses the second color component of the first two-dimensional image onto the first image plane, and the wherein the activated third switchable HOE focuses the third color component of the first two-dimensional image onto the first image plane. It is noted that the first, second, and third HOEs may be activated concurrently or sequentially with the display of the first, second, or third color components of the first two-dimensional image. After the first, second, and third color components are displayed, the first, second and third switchable HOEs are deactivated. Then, first, second, and third color components of a second two-dimensional image are sequentially displayed. The second two-dimensional image represents a second slice of the three-dimensional image. A fourth switchable HOE may be activated to focus the first color component of the second two-dimensional image onto a second image plane. The second image plane is adjacent to the first image plane.

24 Claims, 17 Drawing Sheets

U.S. PATENT DOCUMENTS

| | | | |
|---|---|---|---|
| 4,932,731 A | 6/1990 | Suzuki et al. | 350/3.7 |
| 4,938,568 A | 7/1990 | Margerum | 350/334 |
| 4,981,332 A | 1/1991 | Smith | 350/3.6 |
| 5,096,282 A | 3/1992 | Margerum | 359/3 |
| 5,198,912 A | 3/1993 | Ingwall et al. | 359/3 |
| 5,365,354 A | 11/1994 | Jannson et al. | 359/15 |
| 5,418,631 A | 5/1995 | Tedesco | 359/15 |
| 5,471,327 A | 11/1995 | Tedesco et al. | 359/15 |
| 5,506,701 A | 4/1996 | Ichikawa | 359/15 |
| 5,594,560 A | 1/1997 | Jelley et al. | 359/15 |
| 5,621,547 A | 4/1997 | Loiseaux et al. | 359/15 |
| 5,650,865 A | 7/1997 | Smith | 359/15 |
| 5,680,231 A | 10/1997 | Grindberg et al. | 359/15 |
| 5,698,343 A | 12/1997 | Sutherland et al. | 430/1 |
| 5,703,702 A | 12/1997 | Crane et al. | 359/1 |
| 5,721,598 A | 2/1998 | Smith | 349/106 |
| 5,745,203 A | 4/1998 | Valliath et al. | 349/113 |
| 5,748,828 A | 5/1998 | Steiner et al. | 385/146 |
| 5,751,452 A | 5/1998 | Tanaka et al. | 359/52 |
| 5,758,272 A | 5/1998 | Hong | 455/234.2 |
| 5,764,317 A * | 6/1998 | Sadovnik | 349/5 |
| 5,768,242 A * | 6/1998 | Juday | 369/103 |
| 5,784,181 A | 7/1998 | Loiseaux et al. | 359/1 |
| 5,796,499 A | 8/1998 | Wenyon | 359/15 |
| 5,822,029 A | 10/1998 | Davis et al. | 349/115 |
| 5,828,471 A | 10/1998 | Davis et al. | 359/15 |
| 5,875,012 A | 2/1999 | Crawford et al. | 349/74 |
| 5,942,157 A | 8/1999 | Sutherland et al. | 252/582 |
| 6,082,862 A | 7/2000 | Popovich | 353/30 |
| 6,384,809 B1 * | 5/2002 | Smith | 345/101 |

FOREIGN PATENT DOCUMENTS

| | | | |
|---|---|---|---|
| FR | 2610733 | | 12/1988 |
| JP | 3-84516 | * | 4/1991 |
| JP | 3084516 A | | 10/1991 |

OTHER PUBLICATIONS

Sutherland, R. L., "Optical Limiters, Switches, and Filters Based on Poloymer Dispersed Liquid Crystals," SPIE, vol. 1080, Liquid Crystal Chemistry, Physics, and Applications, 1989, pp. 83–90.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L., et al., "Switchable Holograms in New Photopolymer–Liquid Crystal Composite Materials," SPIE, vol. 2404, Mar. 1995, pp. 132–143.

Databse Inspec Online!; Institute of Electrical Engineers: L. V. Natarajan, et al., Holographic PDLCs for optical beam modulation, deflection, and dynamic filter applications.

L. V. Natarajan, et al., "Spatial Light Modulators," *The Proceedings of the SPIE—The International Society for Optical Engineering*, Jan. 28–29, 1998, vol. 3292, pp. 44–51.

* cited by examiner

SLANTED
TRANSMISSION

SLANTED
REFLECTION

LIGHT TRANSMITTED

LIGHT BLOCKED

TRANSMITTED

RETRO-REFLECTED

UNSWITCHED STATE

SWITCHED STATE

THREE DIMENSIONAL PROJECTION SYSTEMS BASED ON SWITCHABLE HOLOGRAPHIC OPTICS

RELATED APPLICATIONS

This application is a continuation-in-part of U.S. application Ser. No. 09/334,286, entitled "Three Dimensional Projection Systems Based on Reconfigurable Holographic Optics," by inventors Milan M. Popovich and Jonathan D. Waldern, filed Jun. 16, 1999 now abandoned.

BACKGROUND OF THE INVENTION

1. Field of the Invention

The invention relates generally to image projection systems, and particularly to three-dimensional projection systems.

2. Description of the Related Art

Video display and projection systems are ubiquitous devices with applications in many settings. Simple TV's are a major tool in the communication of images for entertainment, news, and advertising. Computer monitors are an indispensable tool for displaying text, images, video, and other graphics. From the simplest black and white television to the most advanced computer-graphics monitors, however, video displays have hitherto been inherently two-dimensional devices. They display information on a flat surface, with any three-dimensional structure compressed into a single plane of view.

Efforts have been made on a number of fronts to present 3-D structures on 2-D media. One class of techniques involves stereo imaging, which uses the binocular aspect of the human visual system to simulate 3-D imagery. In these techniques, the viewer's eyes are presented with two separate 2-D views of a 3-D object. Each eye is provided with the picture that would been seen from a point in space where that eye would be located while viewing the 3-D object. When the viewer's eyes align to merge the separate images into a single image, parallax effects create the illusion of an image with depth.

3-D motion pictures are a common application of stereo imaging. In this application, two images are simultaneously projected onto a single movie screen using polarized light. The polarizations used in generating the two images are orthogonal to each other. When viewed directly, the screen shows a blurred combination of two separate images. When viewed through polarized "3-D glasses," however, each of the viewer's eyes sees only one of the two images. The viewer can then naturally combine the two images into a single fused 3-D image.

Stereo imaging is also used in "random-dot stereograms." These are pictures that initially appear to be a random collection of dots. When a viewer appropriately aligns his eyes, two separate collections of dots in the stereogram overlap, fusing into a single 3-D image.

Another technique used to present 3-D images is to combine several views of the same 3-D object into parallel strips on a single flat picture, and then to cover the picture with a lenticular screen so that each of the views is only visible when the picture is seen from a particular angle. While this technique does not rely on binocular vision, it is similar to stereo imaging in that the number of different views available to an observer is strongly limited. The observer can only view the 3-D object from those angles corresponding to the views that were combined into the single flat picture. The lenticular screen technique has been used in cameras that take 3-D photographs and in the production of "holographic" images on trading cards and other novelty items.

A simpler approach to displaying 3-D objects has been to display them as flat images with visual cues that suggest the solid nature of the objects. This technique generally starts with wire-grid drawings that illustrate the principal vertices, edges, and surfaces of a 3-D object. The illusion of depth is created by providing visual cues such as perspective: elements are drawn smaller when they are closer to a "vanishing point" in the image. The objects may then be rendered into solid-looking structures by adding color and shading to the unhidden surfaces. Because of the small amount of information required to render a wire-grid drawing, this technique has found widespread use in computer animation. Nonetheless, it is inherently a 2-D technique: the position of the viewer's eye does not affect what is seen by the viewer.

True holograms are interferometric recordings of three-dimensional objects onto a holographic recording medium. Unlike standard photographs, which record only the intensity of incident light, holograms record the phase as well as the intensity of the light that illuminates them. When appropriately illuminated by coherent light scattered from a three-dimensional object, a hologram records the wave fronts created by the object. During subsequent viewing, the hologram is appropriately illuminated by a light source. It functions as a diffraction grating, scattering the light in various directions. The hologram scatters the light in such a way as to recreate the originally recorded wavefronts. The result is a real or virtual image of the original three-dimensional object. Unlike the images generated by stereo images, lenticular stereographic images, wire-grid drawings, and other 2-D images, holograms provide a 3-D image that can be inspected from a number of different viewpoints selected by the observer.

Holograms tend to be largely monochromatic, since the interference effects used to record and display a hologram are highly wavelength-specific. They are also limited to the recording of static objects. Thus, holograms have not found widespread practical applications in video display technology.

Instead of recording a particular three-dimensional object, a hologram may be used as a diffraction grating that reproduces the effects of a particular optical element, such as a lens or a mirror. These "holographic optical elements" (HOEs) may be far easier and less expensive to produce than their glass counterparts, especially when the optical element is complicated or must meet stringent tolerances. HOEs may generally be employed in any place where the corresponding glass optical element is used. HOEs have found applications in video projection systems, where large-dimension (wide) optical elements are required. They take the place of large lenses and other beam-shaping elements that can be expensive to produce in glass.

SUMMARY OF THE INVENTION

Described herein are systems and methods for projecting images that use switchable holographic optical elements (HOEs). These systems and methods can be used to project three-dimensional images or to project two-dimensional tiled images with increased size and/or resolution. One of the methods may include sequentially displaying first, second, and third color components of a first two-dimensional image at an object plane. The first two dimensional image represents a first slice of a three-dimensional image. As the first, second, and third color components are displayed, first, second and third HOEs may be activated so that the activated first switchable HOE focuses the first color component of the first two-dimensional image onto a first image plane, the activated second switchable HOE focuses the second color component of the first two-dimensional image onto the first image plane, and the wherein the activated third switchable HOE focuses the third color component of the first two-dimensional image onto the first image plane. It is noted that the first, second, and third HOEs may be activated concurrently or sequentially with the display of the first, second, or third color components of the first two-dimensional image. After the first, second, and third color components are displayed, the first, second and third switchable HOEs are deactivated. Then, first, second, and third color components of a second two-dimensional image are sequentially displayed. The second two-dimensional image represents a second slice of the three-dimensional image. A fourth switchable HOE may be activated to focus the first color component of the second two-dimensional image onto a second image plane. The second image plane is adjacent to the first image plane.

The switchable HOEs may be arranged in parallel on a common optic axis. Alternatively, they may be arranged side-by-side on a single plane. One embodiment of the projection system uses a combination of these arrangements: three sheets of HOEs are arranged in a stack, with each sheet capable of diffracting a single color of light. Each sheet includes an array of HOEs with varying focal lengths. The sheets are aligned in the stack so that each lens element for a given focal length on one sheet is coaxially aligned with a lens element for the same focal length on the other two sheets.

The switchable HOEs can also be used in image projection method and system that projects an image composed of an array of "tiles." Each tile is a single image displayed on a display device, such as a reflective LCD display. The display device is configured to sequentially display tile elements of the image. The image projection system also includes a switchable HOE configured to focus the two-dimensional display onto a sequence of positions on an image plane. The display device and the switchable HOE are synchronized so that tile elements are focussed onto their appropriate corresponding array positions in the image plane. The system sequences through the plurality of tile elements rapidly, displaying an entire image in less than 100 ms. Thus, the displayed image appears as a single, continuous image.

BRIEF DESCRIPTION OF THE DRAWINGS

Other objects and advantages of the invention will become apparent upon reading the following detailed description and upon reference to the accompanying drawings in which.

Figure 1:
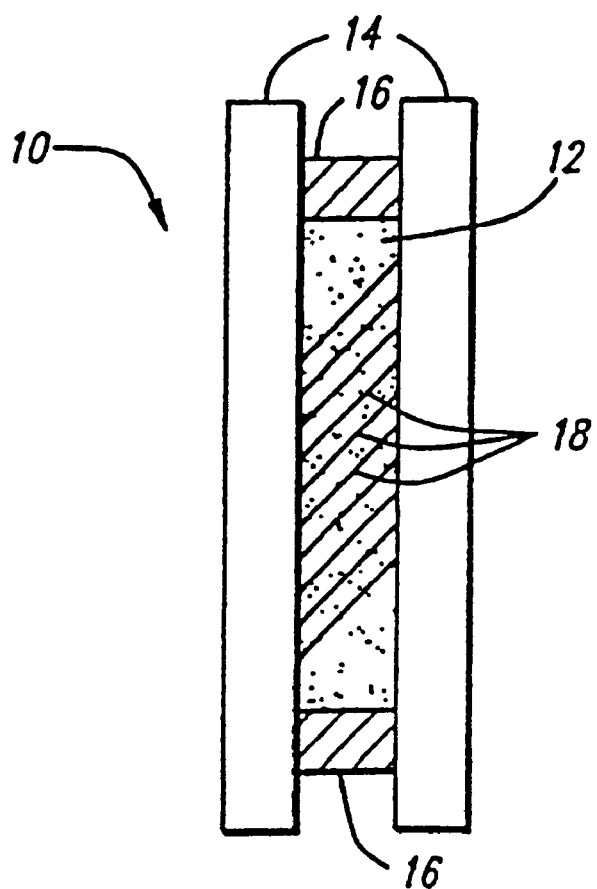
FIG. 1 is a cross-sectional view of an electrically switchable hologram made of an exposed polymer-dispersed liquid crystal (PDLC) material.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the claims set forth below.

DETAILED DESCRIPTION OF THE PREFERRED EMBODIMENTS

The introduction of switchable (or "reconfigurable") holographic optical elements (HOEs) enables the construction of several types of video projection systems. These systems may be configured to project true 3-D images. They may also be configured to project large 2-D images by projecting a series of tiles that make up the large image. In one embodiment, the switchable HOEs can be switched by an applied electric field from a state in which they diffract light to a state in which they merely transmit light without substantial alteration. In other embodiments, an optical system of several switchable HOEs may be switched between a number of states in which the optical system operates as one of several distinct optical elements.

FIGS. 1–17: Switchable Hologram Materials and Devices

Holographic optical elements are formed, in one embodiment, from a polymer dispersed liquid crystal (PDLC) material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the holographic optical elements may be formed in a single step. The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. No. 08/273,436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

In one embodiment, the process of forming a hologram is controlled primarily by the choice of components used to prepare the homogeneous starting mixture, and to a lesser extent by the intensity of the incident light pattern. In one embodiment, the polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting PDLC material may have an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photoinitiator dye, a coinitiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to tend to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used. In one embodiment, it has been found that an approximately 1:4 mixture of tri- to penta-acrylate facilitates homogeneous mixing while providing a favorable mixture for forming 10–20 $\mu$m films on the optical plates.

The second phase material of choice is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, -methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the formulation of the hologram controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in producing holographic optical elements, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in creating holographic optical elements may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6V/$\mu$m.

PDLC materials may also be formed using a liquid crystalline bifunctional acrylate as the monomer ("LC monomer"). LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCD in the PDLC material greatly lowers the switching voltages (e.g., to ~2V/$\mu$m). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

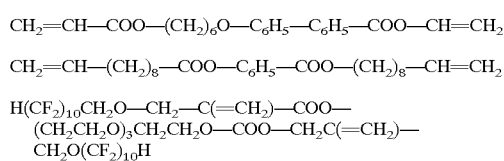

Semifluorinated polymers are known to show weaker anchoring properties and also significantly reduced switching fields. Thus, it is believed that semifluorinated acrylate monomers which are bifunctional and liquid crystalline may find suitable application in the formulation of holograms.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
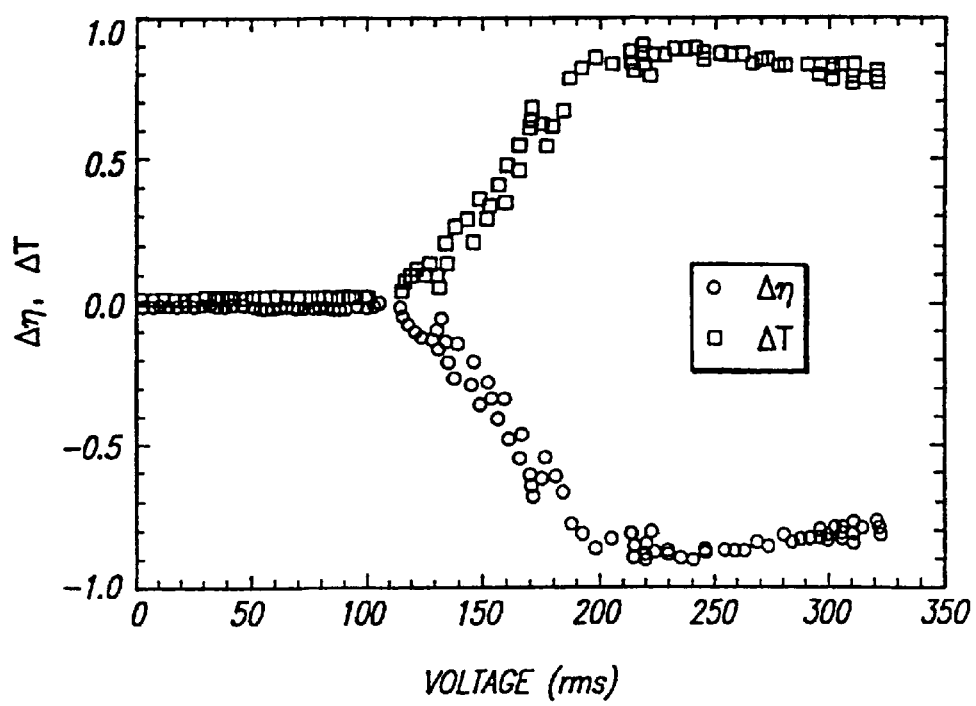
FIG. 2 is a graph of the normalized net transmittance and normalized net diffraction efficiency of a hologram (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 mW/cm$^2$. The size of the liquid crystal domains is about 0.2 $\mu$m and the grating spacing is about 0.54 $\mu$m. This sample, which is approximately 20 $\mu$m thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
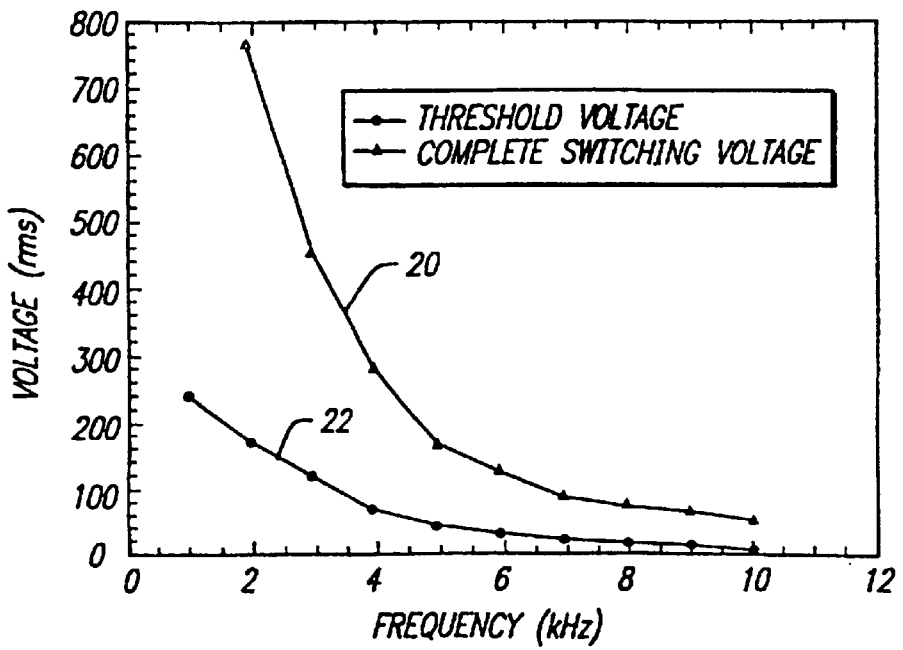
FIG. 3 is a graph of both the threshold and complete switching rms voltages needed for switching a hologram to minimum diffraction efficiency versus the frequency of the rms voltage.
Figure 4:
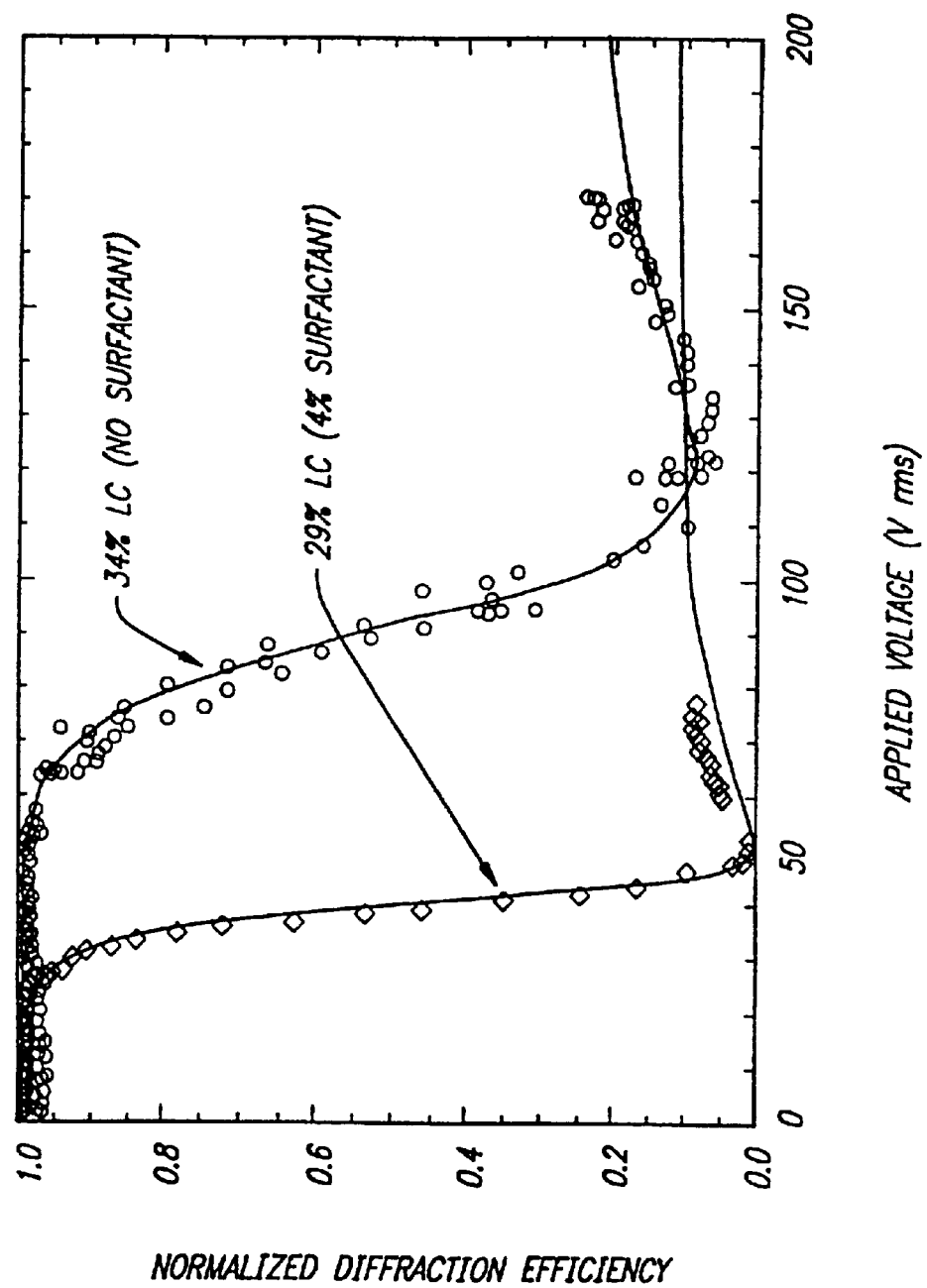
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 5:
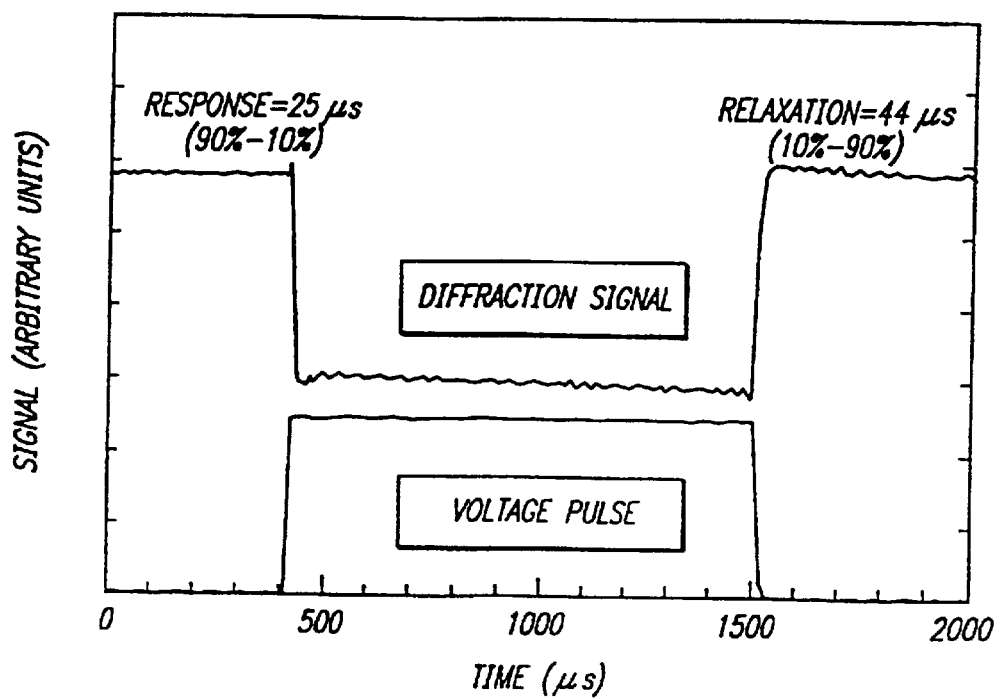
FIG. 5 is a graph showing the switching response time data for the diffracted beam in the surfactant-containing PDLC material in FIG. 4.
Figure 6:
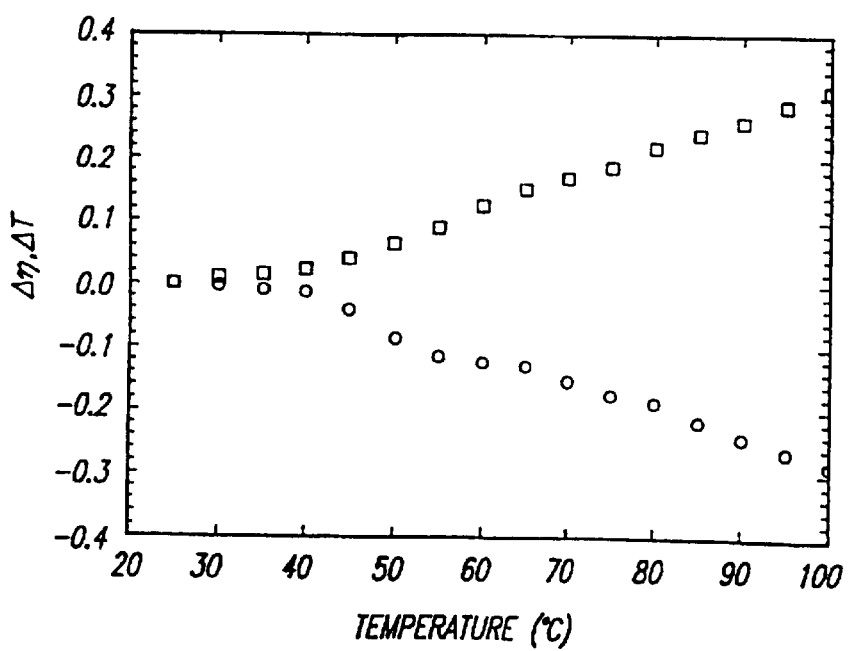
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size, reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
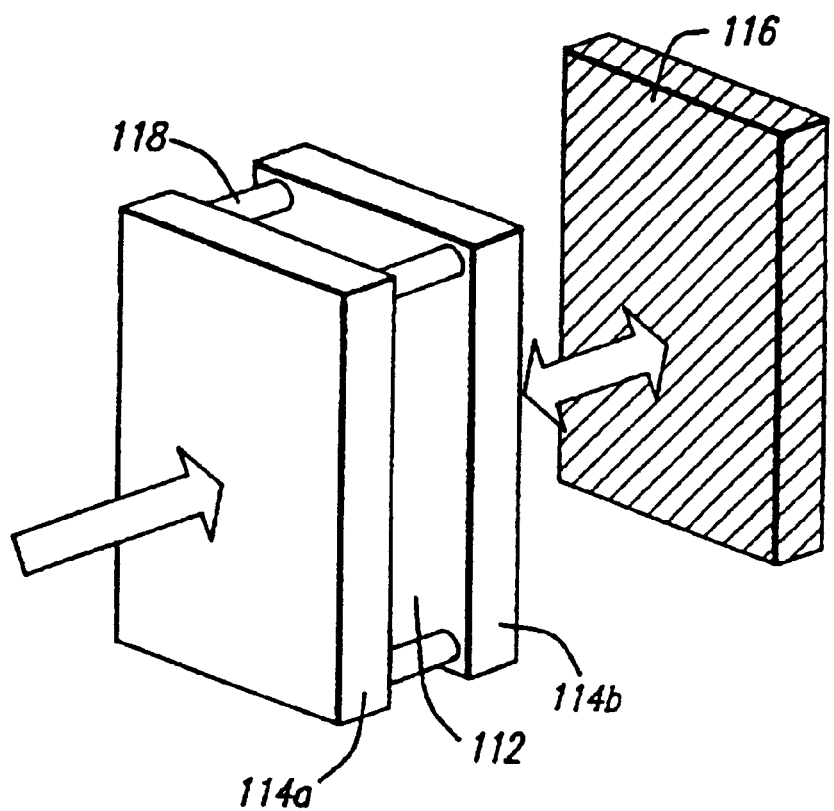
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114*a*. A second indium-tin oxide coated slide 114*b* is then pressed against the first, thereby causing the prepolymer material 112 to fill the region between the slides 114*a* and 114*b*. Preferably, the separation of the slides is maintained at approximately 20 µm by utilizing uniform spacers 118. Preparation, mixing and transfer of the prepolymer material is preferably done in the dark. Once assembled, a mirror 116 may be placed directly behind the glass plate 114*b*. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8*a*, grating 130 includes periodic planes of polymer channels 130*a* and PDLC channels 130*b* which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an argon ion laser, that the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8B:
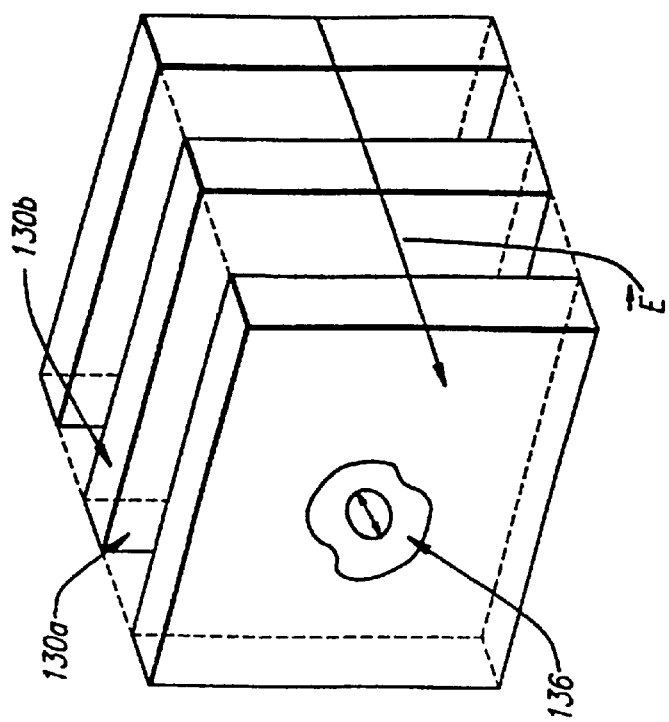
FIG. 8a and FIG. 8b are elevational views of a reflection grating having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.
Figure 8A:
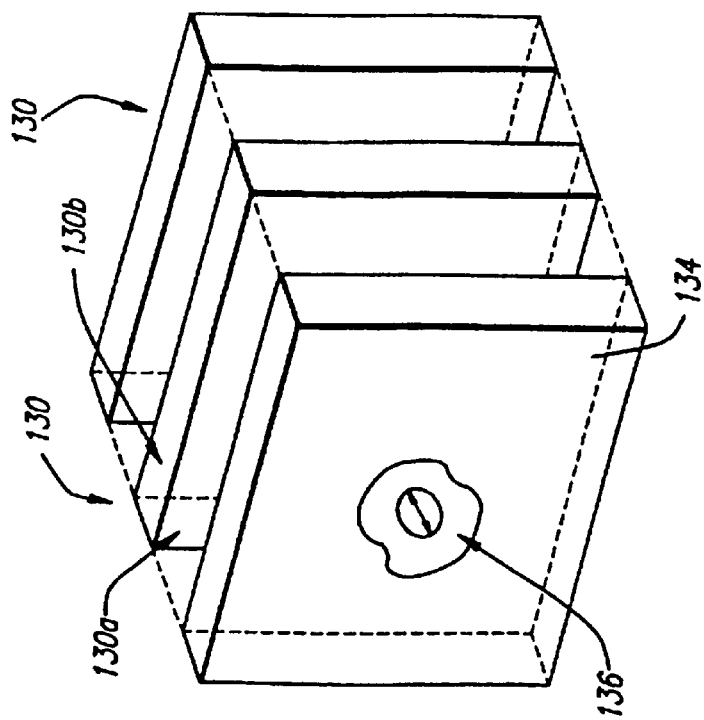

Referring again to FIG. 8*a*, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9B:
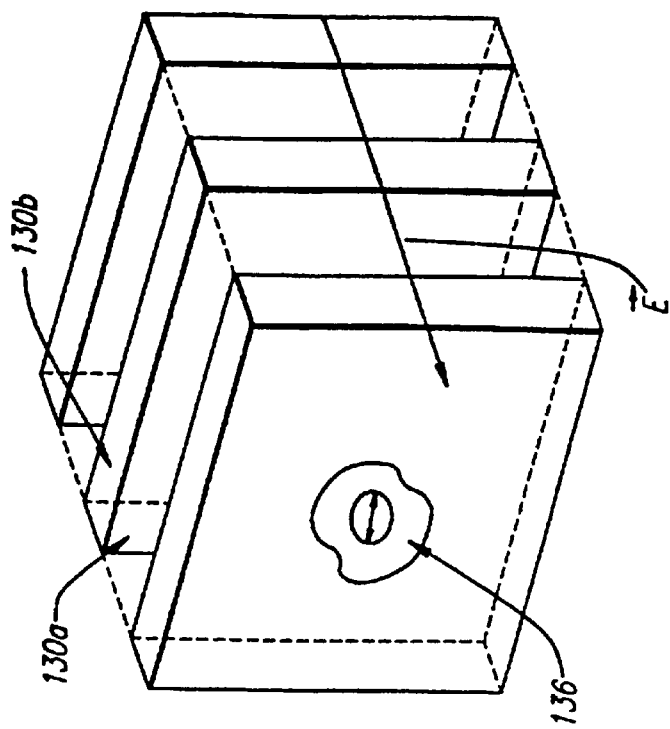
FIG. 9a and FIG. 9b are elevational views of a reflection grating having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9A:
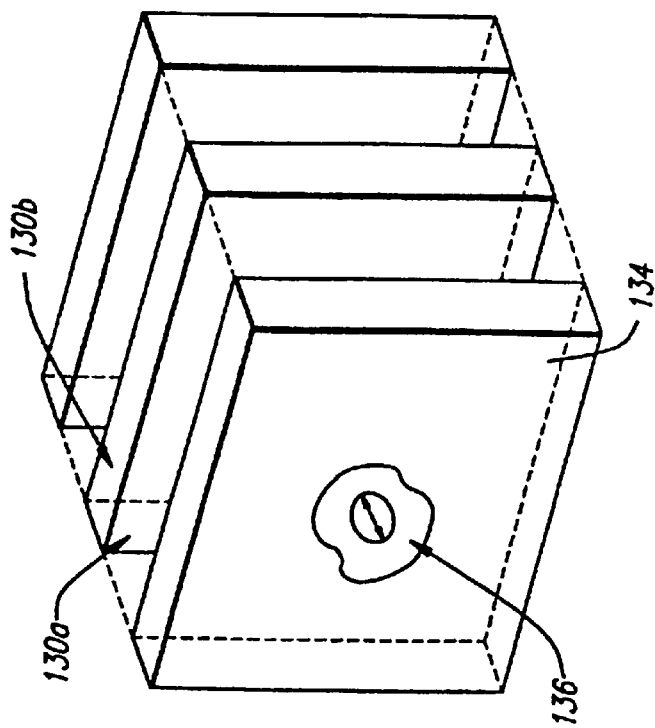

It is known that liquid crystals having a negative dielectric anisotropy ($\Delta\epsilon$) will rotate in a direction perpendicular to an applied field. As shown in FIG. 9a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystals and others are expected to find ready applications in the methods and devises of the present invention:

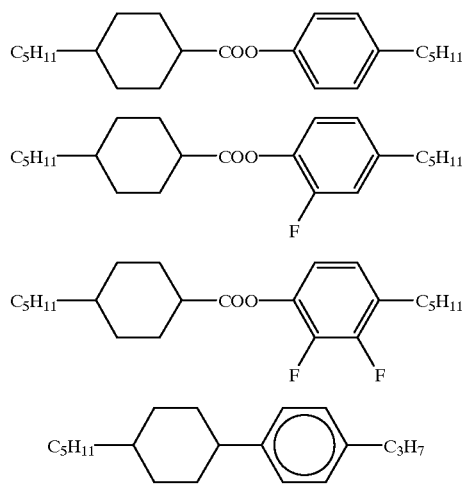

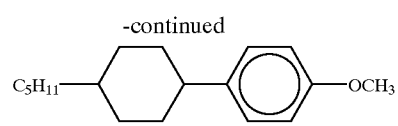

Liquid crystals can be found in nature (or synthesized) with either positive or negative $\Delta\epsilon$. Thus, it is possible to use a LC which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with LC composition, and typical values range from 1–10 kHz. Thus, by operating at the proper frequency, the reflection grating may be switched. It is expected that low crossover frequency materials can be prepared from a combination of positive and negative dielectric anisotropy liquid crystals. A suitable positive dielectric liquid crystal for use in such a combination contains four ring esters as shown below:

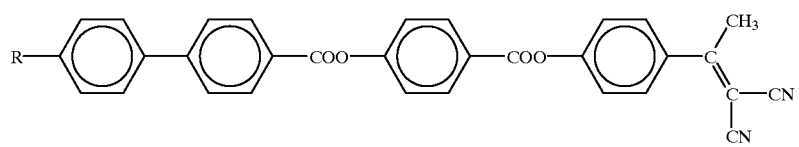

A strongly negative dielectric liquid crystal suitable for use in such a combination is made up of pyridazines as shown below:

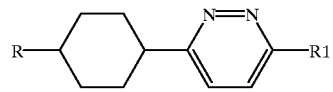

Both liquid crystal materials are available from LaRoche & Co., Switzerland. By varying the proportion of the positive and negative liquid crystals in the combination, cross-over frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

Figure 10A:
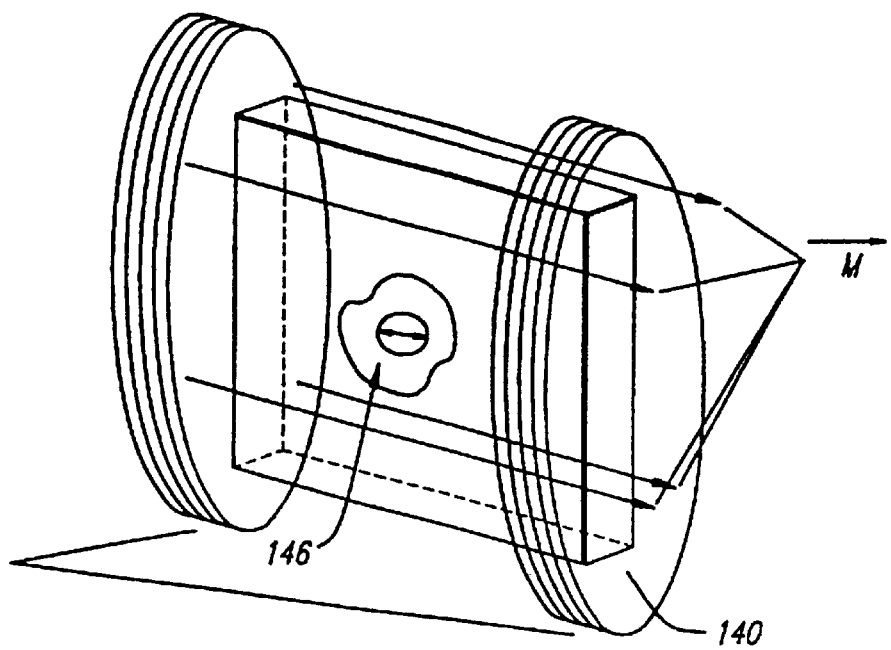
FIG. 10a is an elevational view of a reflection grating disposed within a magnetic field generated by Helmholtz coils.
Figure 10B:
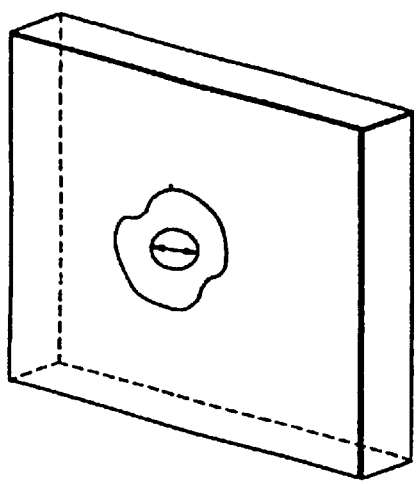
FIG. 10b and FIG. 10c are elevational views of the reflection grating of FIG. 10a in the absence of an electric field (FIG. 10b) and with an electric field applied (FIG. 10c)
Figure 10C:
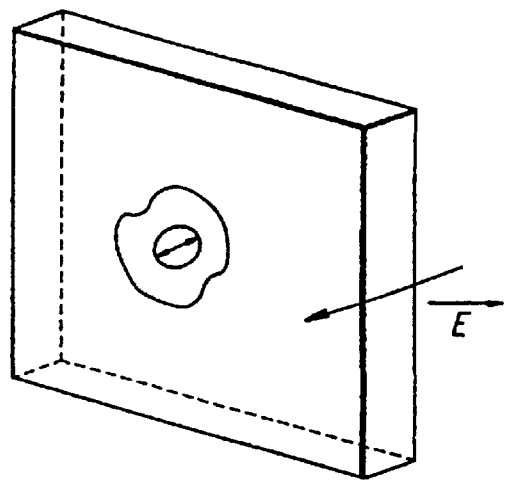

In still more detailed aspects, switchable reflection gratings can be formed using positive $\Delta\epsilon$ liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\epsilon$ liquid crystal will reorient in the direction of the field, which is perpendicular to the front surface of grating and to the periodic channels of the grating.

Figure 11A:
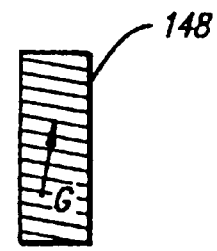
FIG. 11a and FIG. 11b are representative side views of a slanted transmission grating (FIG. 11a) and a slanted reflection grating (FIG. 11b) showing the orientation of the grating vector G of the periodic planes of polymer channels and PDLC channels.
Figure 11B:
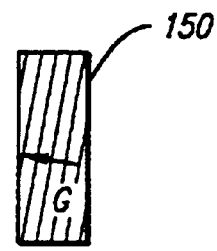

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

Figure 12:
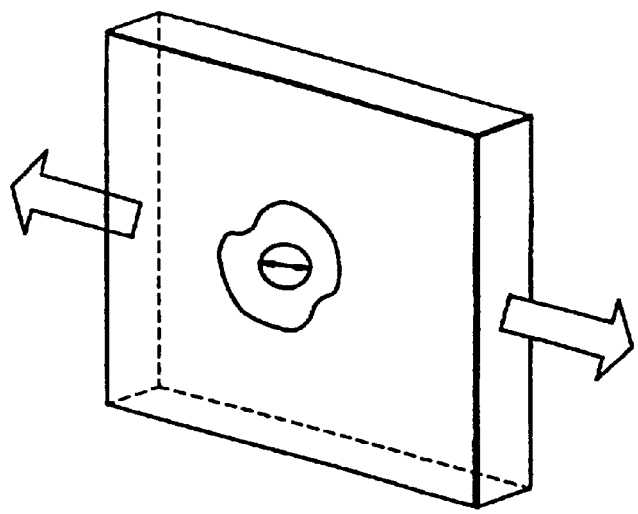
FIG. 12 is an elevational view of a reflection grating when a shear stress field is applied thereto.

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
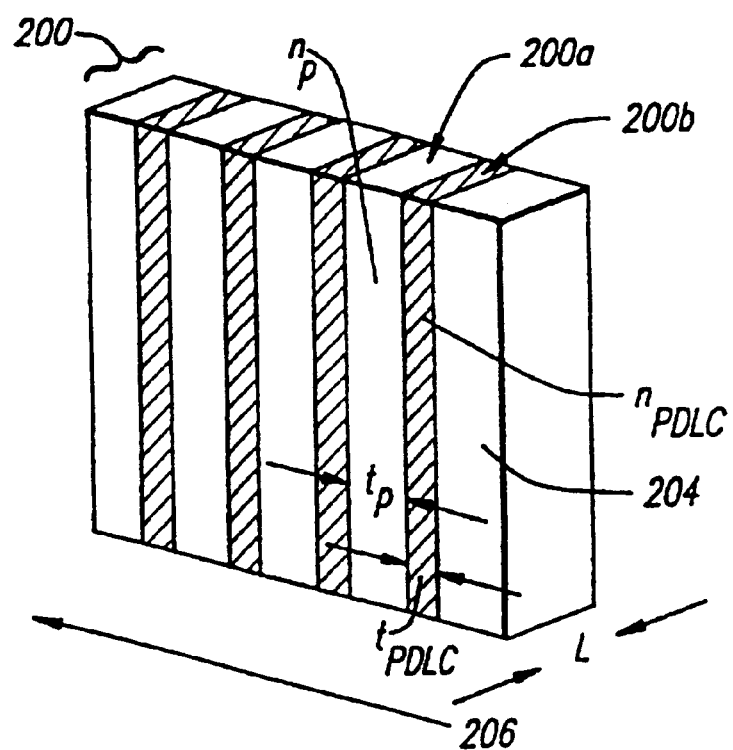
FIG. 13 is an elevational view of a subwavelength grating having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=$\lambda/2$, and to form a quarter-wave plate, the retardance must be equal to one-quarter of a wavelength, i.e. retardance=$\lambda/4$. It is known that the retardance is related to the net birefringence, $|\Delta n|$, which is the difference between the ordinary index of refraction, $|\Delta n|$, and the extraordinary index of refraction $n_e$, of the sub-wavelength grating by the following relation:

$$\text{Retardance}=|\Delta n|L=|n_e-n_o|L$$

Thus, for a half-wave plate, i.e. a retardation equal to one-half of a wavelength, the length of the subwavelength grating should be selected so that:

$$L=\lambda/(2|\Delta n|)$$

Similarly, for a quarter-wave plate, i.e. a retardation equal to one-quarter of a wavelength, the length of the subwavelength grating should be selected so that:

$$L=\lambda/(4|\Delta n|)$$

Figure 14A:
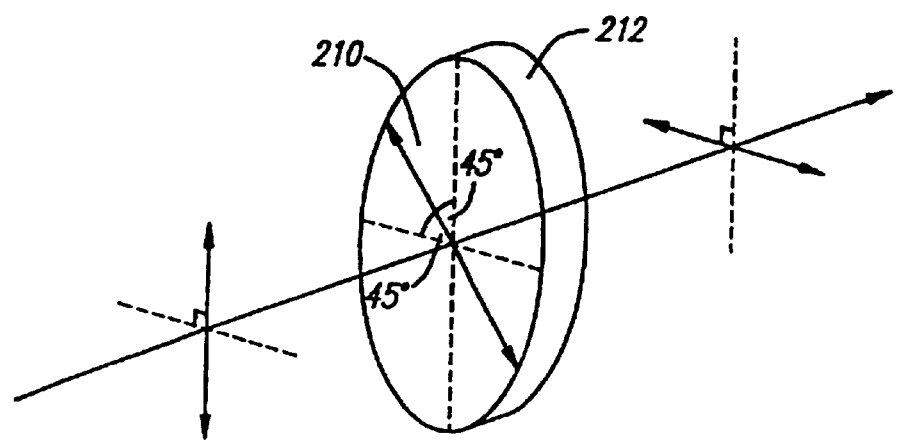
FIG. 14a is an elevational view of a switchable subwavelength wherein the subwavelength grating functions as a half wave plate whereby the polarization of the incident radiation is rotated by 90°.
Figure 14B:
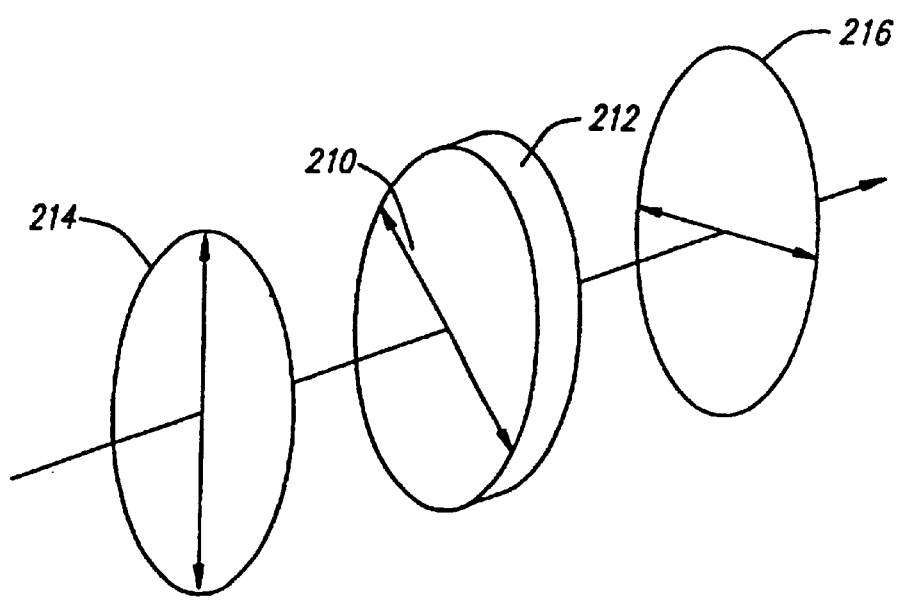
FIG. 14b is an elevational view of the switchable half wave plate shown in FIG. 14a disposed between crossed polarizers whereby the incident light is transmitted.
Figure 14C:
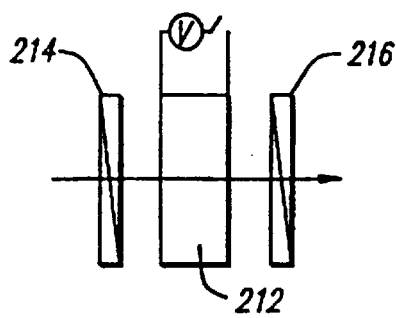
FIG. 14c and FIG. 14d are side views of the switchable half wave plate and crossed polarizes shown in FIG. 14b and showing the effect of the application of a voltage to the plate whereby the polarization of the light is no longer rotated and thus blocked by the second polarizer.
Figure 14D:
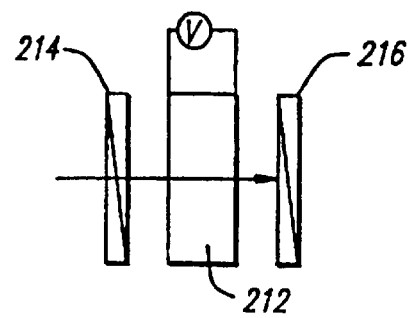

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIGS. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
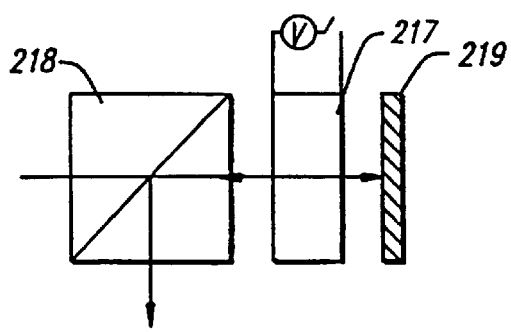
FIG. 15a is a side view of a switchable subwavelength grating wherein the subwavelength grating functions as a quarter wave plate whereby plane polarized light is transmitted through the subwavelength grating, retroreflected by a mirror and reflected by the beam splitter.
Figure 15B:
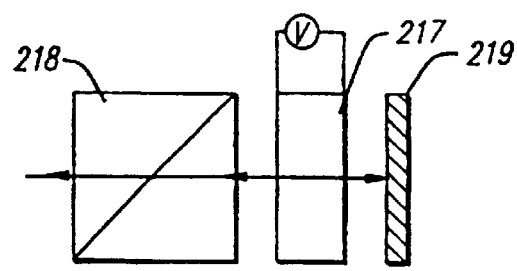
FIG. 15b is a side view of the switchable subwavelength grating of FIG. 15a and showing the effect of the application of a voltage to the plate whereby the polarization of the light is no longer modified, thereby permitting the reflected light to pass through he beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
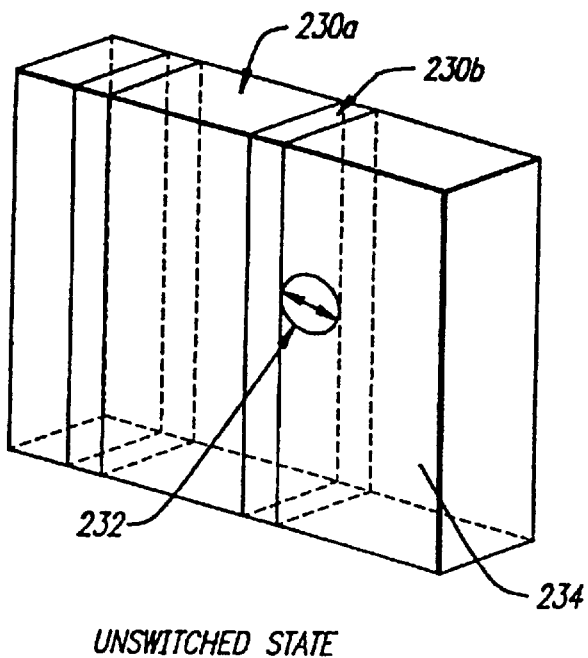
FIG. 16a and FIG. 16b are elevational views of a transmission grating having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
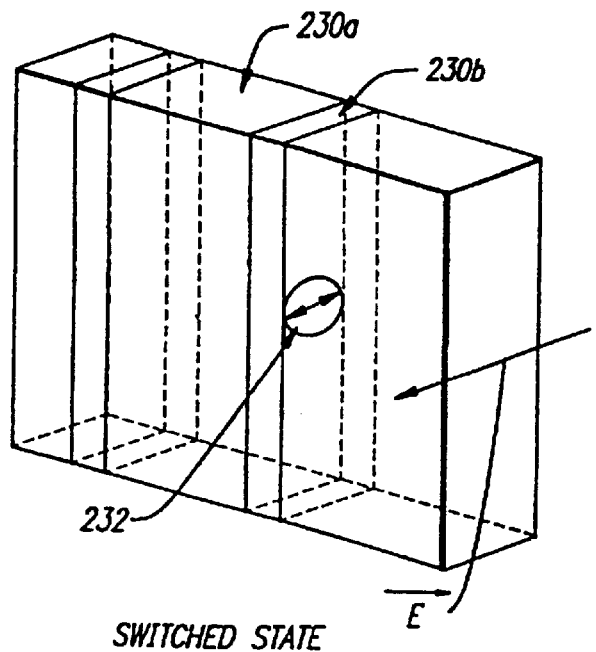

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, $5^{th}$ Ed., New York (1975) and incorporated herein by reference, the birefringence of a subwavelength grating is given by the following relation:

$$n_e^2 - n_o^2 = -[(f_{PDLC})(f_p)(n_{PDLC}^2 - n_p^2)]/[f_{PDLC} \, n_{PDLC}^2 + f_p n_p^2]$$

Where:

$n_o$=the ordinary index of refraction of the subwavelength grating;

$n_e$=the extraordinary index of refraction;

$n_{PDLC}$=the refractive index of the PDLC plane;

$n_p$=the refractive index of the polymer plane $n_{LC}$=the effective refractive index of the liquid crystal seen by an incident optical wave;

$f_{PDLC} = t_{PDLC}/(t_{PDLC}+t_P)$ $f_P = t_P/(t_{PDLC}+t_P)$

Thus, the net birefringence of the subwavelength grating will be zero if $n_{PDLC}=n_P$.

It is known that the effective refractive index of the liquid crystal, $n_{LC}$, is a function of the applied electric field, having a maximum when the field is zero and value equal to that of the polymer, $n_P$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC}=n_P$. Therefore, if the refractive index of the PDLC plane can be matched to the refractive index of the polymer plane, i.e. $n_{PDLC}=n_P$, by the application of an electric field, the birefringence of the subwavelength grating can be switched off.

The following equation for net birefringence, i.e. $|\Delta n| = |n_e - n_o|$, follows from the equation given in Born and Wolf (reproduced above):

$$\Delta n = -[(f_{PDLC})(f_p)(n_{PDLC}^2 - n_p^2)]/[2n_{AVG}(f_{PDLC} \, n_{PDLC}^2 + f_p n_p^2)]$$

where $n_{AVG}=(n_e+n_o)/2$.

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC} = n_P + f_{LC}[n_{LC} - n_P]$$

Where $f_{LC}$ is the volume fraction of liquid crystal dispersed in the polymer within the PDLC plane, $f_{LC}=[V_{LC}/(V_{LC}+V_P)]$.

By way of example, a typical value for the effective refractive index for the liquid crystal in the absence of an electric field is $n_{LC}$=1.7, and for the polymer layer $n_P$=1.5. For the grating where the thickness of the PDLC planes and the polymer planes are equal (i.e. $t_{PDLC}=t_P$, $f_{PDLC}=0.5=f_P$) and $f_{LC}$=0.35, the net birefringence, $\Delta n$, of the subwavelength grating is approximately 0.008. Thus, where the incident light has a wavelength of 0.8 μm, the length of the subwavelength grating should be 50 μm for a half-wave plate and a 25 μm for a quarter-wave plate. Furthermore, by application of an electric field of approximately 5 V/μm, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
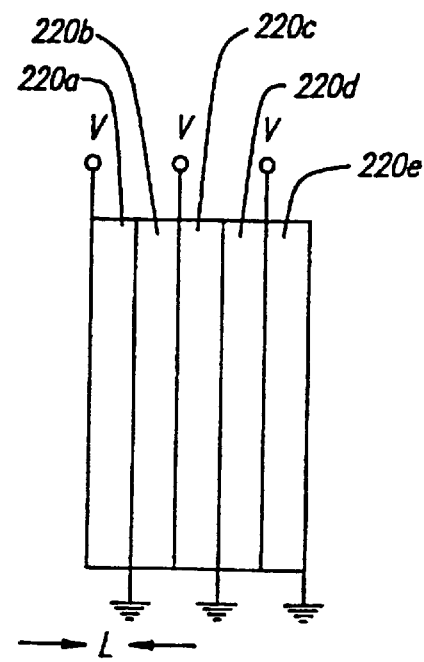
FIG. 17 is a side view of five subwavelength gratings wherein the gratings are stacked and connected electrically in parallel thereby reducing the switching voltage of the subwavelength grating.

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 μm yields the thickness required for a half-wave plate. It should be noted that the length of the sample is somewhat greater than 50 μm, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like.

In a preferred embodiment, a switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film (Δn~0.5) because the second phase domains are replaced with empty (air) voids (n~1).

Similarly, in accordance with this description a high birefringence static sub-wavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

Figure 18:
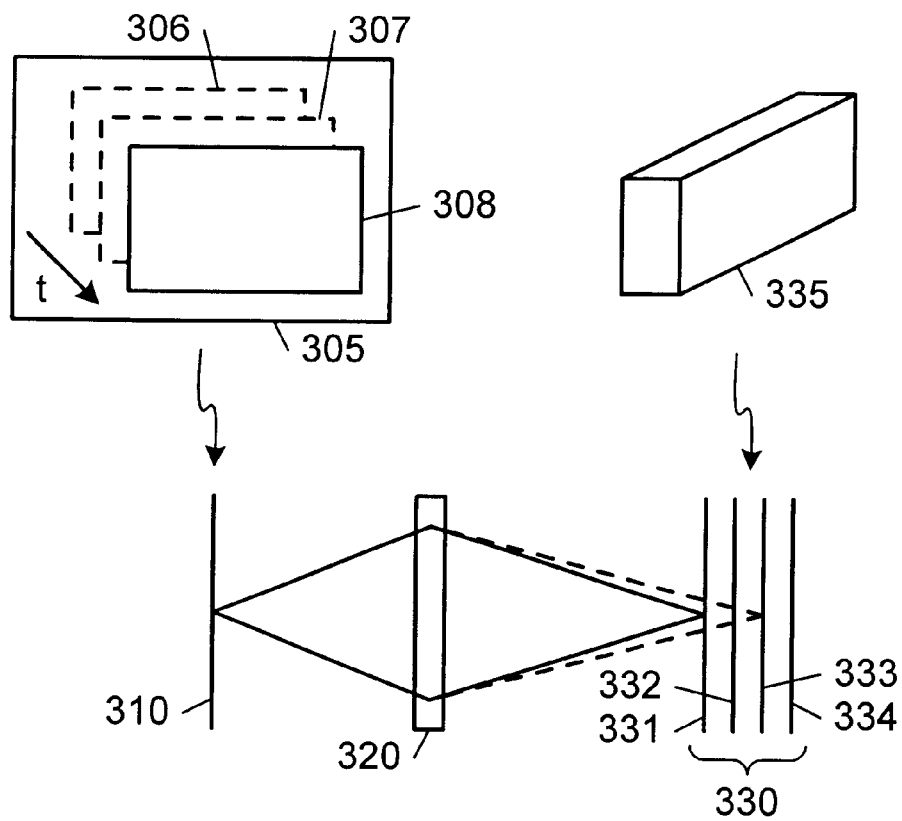
FIG. 18 shows a system for projecting 3-D objects that uses switchable holographic elements.
Figure 19:
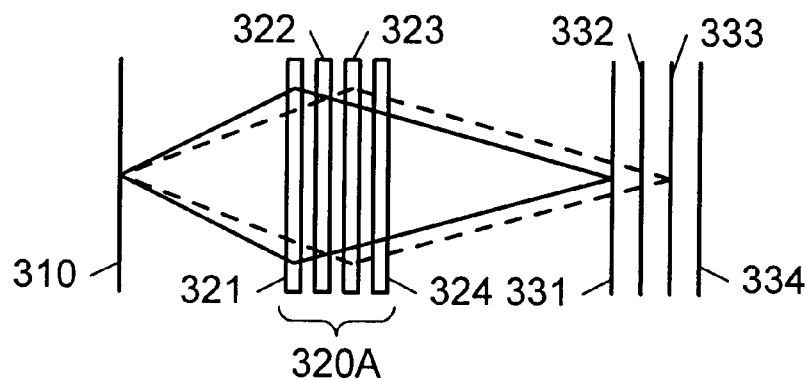
FIG. 19 shows an embodiment of the system from FIG. 18 that uses a stack of holographic elements that can be selectively made transparent.

FIGS. 18 and 19: Three-dimensional Projection With Switchable Holographic Optical Elements FIG. 18 illustrates the operation of one embodiment of a 3-D projection system. The system comprises a flat display unit 305, such as an LCD display that can display a sequence of images, and a switchable holographic optical system 320. In this embodiment, a viewer may observe a projected 3-D image by looking toward switchable holographic optical system 320; the 3-D image appears in an image volume 330, between the viewer and switchable holographic optical system 320.

Display unit 305 displays a series of images 306–308 in sequence. These images are cross-sectional views through a solid 3-D object. Display unit 305 is preferably an LCD display, such as a reflective display mounted on a silicon substrate. In another embodiment, the LCD display is a transmissive display. Other types of displays may also be used for display unit 305, such as standard cathode ray tubes. Display unit 305 is mounted at the object plane 310 of the projection system.

Among the optical elements of the projection system is a switchable holographic optical system 320. Switchable holographic optical system 320 can be switched among several operating modes. In each operating mode, system 320 behaves as one of several conventional optical elements, including lenses with various focal lengths. As the successive cross-sections are displayed on display unit 305, switchable holographic optical system 320 is successively switched between different modes of operation so that it focuses object plane 310 onto a series of image planes 331–334. This switching of focal lengths is synchronized with the switching of cross-sections displayed on display unit 305, and is performed at a rate that is fast in comparison with the integration time of the human eye (approximately 100 milliseconds). The result is that the several cross-sections displayed on display unit 305 are imaged onto an "image volume" 330 that is made up of image planes 331–334. The image 335 cast onto image volume 330 by this system is a real image. Thus, if the light from object plane 310 has sufficient intensity, a viewer may directly observe image 335 as a reconstructed three-dimensional image that appear to float in the image volume 330. With lower intensities of light, a "viewing screen" can be placed at image volume 330 to facilitate observation of 3-D image 335. This viewing screen may be composed of a volumetric semi-transparent diffuser. In other embodiments, the diffuser is a stack of planar diffusers. In yet another embodiment, the 3-D diffuser is made of one or a few vibrating planar diffusers.

In one embodiment of the projection system, the cross-sections used in images 306–308 are line drawings of the outline of 3-D object. When these cross sections are projected onto image volume 330, the result is an image 335 showing the surfaces of the original 3-D object. In another embodiment, the line drawings in images 306–308 are filled, resulting in an apparently solid image 335. In another embodiment, the cross sections in images 306–308 are created with hidden-line/hidden-surface removal to eliminate some of the extraneous lines and surfaces from the displayed image 335.

Switchable holographic optical system 320 is an optical element whose optical properties are controlled by an applied control signal. In one embodiment, switchable optical system 320 is a single switchable holographic optical element whose optical properties can be rapidly switched among several operating modes. In another embodiment, switchable optical system 320 comprises several switchable holographic optical elements, each of which can be switched between a diffracting state and a substantially transparent state.

FIG. 19 illustrates one embodiment of the 3-D projection system comprising several switchable holographic optical elements (HOEs). In this embodiment, the switchable holographic optical system 320A is made out of switchable HOEs 321–324, each of which can be switched between a diffracting state and a substantially transparent state. One or more of the switchable HOEs 321–324 may include an exposed PDLC material such as, for example, the material presented in FIG. 1. The PDLC material undergoes phase separation during the exposure process (i.e., during the hologram recording process), creating regions densely populated by liquid crystal droplets, interspersed by regions of clear photopolymer. In the substantially transparent state, an electric field is applied to the exposed PDLC and changes the natural orientation of the liquid crystal droplets therein which, in turn, causes the refractive index modulation of the fringes to reduce and the hologram diffraction efficiency to drop to very low levels, effectively erasing the hologram recorded therein. No electric field is applied in the diffracting state, in which the exposed PDLC material exhibits its very high diffraction efficiency. The exposed PDLC switches between the diffracting state and the substantially transparent state very quickly (e.g., the exposed material can be switched in tens of microseconds, which is very fast when compared with conventional liquid crystal display materials.

The switchable HOEs 321–324 are, in one embodiment, Bragg-type elements that provide a high diffraction efficiency. However, switchable thin-phase HOEs (sometimes referred to as Raman-Nath type) may also be employed, although thin phase HOEs may not provide a high level of diffraction efficiency when compared to Bragg type HOEs. Moreover, the switchable HOEs described herein are transmissive type, it being understood that reflective type switchable HOEs may be employed in addition or instead. In a projection system employing switchable reflective HOEs 321–324 in the optical system 320, the image planes would be on the same side of the optical system 320 as the object plane.

A display unit (such as 305 from FIG. 18) is placed at object plane 310 in FIG. 19 and is imaged onto an image volume 330 composed of several image planes. In this embodiment, however, switchable HOEs 321–324 are used to focus object plane 310 onto the image planes 331–334, respectively, in image volume 330. Switchable HOEs 321–324 are placed next to each other in a holographic optical system 320A. In one embodiment, the number of switchable HOEs in holographic optical system 320A is equal to the number of desired image planes in image volume 330. By way of example, FIG. 19 shows holographic optical system 320A with four switchable HOEs, 321–324, each of which is configured to focus object plane 310 onto one of four image planes 331–334. The switchable HOEs preferably operate in sequence: at any given time, only one of them is active. The active HOE diffracts light so that object plane 310 is focused onto the corresponding image plane. Meanwhile, the remainder of the switchable HOEs are inactive, that is, they are substantially transparent and do not further modify the light transmitted from object plane 310 to image volume 330.

Three-dimensional color objects may be displayed in volume 330 by using additional switchable HOEs in holographic optical system 320A. Instead of using one switchable HOE for each of the image planes, each of the image planes is preferably associated with three switchable HOEs one HOE for each of three primary color components. Thus, holographic optical system 320A, in one embodiment, comprises groups of HOEs 321a–c, 322a–c, 323a–c, and 324a–c, where HOEs 321a, 322a, 323a, and 324a diffract a first color component of image light when active, HOEs 321b, 322b, 323b, and 324b diffract a second color component of image light when active, and HOEs 321c, 322c, 323c, and 324c diffract a third color component of image light when active. The three color components are preferably red, green, and blue (RGB) components. In other embodiments, the color image may be composed of cyan, yellow, and magenta (CYM) components or other sets of three basis colors appropriate for spanning the range of sensitivity of the human eye.

In this embodiment, the projection system rapidly cycles through a series of display modes. In each mode, one color component for one cross-section of three-dimensional object 335 is imaged at one image plane of image volume 330 via one activated HOE element 321a–c, 322a–c, 323a–c, or 324a–c. The projection system sequentially images all three color components of a cross section at an image plane before sequentially imaging the three color components of the next cross section at the next image plane. When all image planes are sequentially imaged, the cycle is restarted. The cycle time of imaging all image planes with the three color components is smaller than an eye integration time.

Although not shown in the figures, holographic optical system 320A, in another embodiment, may include a first group of HOEs 321a–c, 322a–c, 323a–c, 324a–c, a second group of HOEs 321a–c, 322a–c, 323a–c, 324a–c, and a polarization rotator optically positioned therebetween. It is noted that transmissive type HOEs operate on p-polarized light when active while passing s-polarized light with no or substantially no alteration.

With two groups of HOEs and a polarization rotator optically positioned therebetween, all or substantially all light displayed at object plane 310 can be focused onto the image planes 331–334. To illustrate, HOEs 321a in each group are concurrently active while a first component light (e.g., the red light component) of a first image cross section is displayed at object plane 310. Activated HOE 321a in the first group focuses the p-polarized portion of the first component light by diffraction while transmitting the s-polarized portion with little or no alteration. The polarization rotator rotates the transmitted s-polarized portion into p-polarized light. Moreover, the polarization rotator rotates the diffracted p-polarized into diffracted s-polarized light. HOE 321a in the second group is active and receives the p-polarized portion and the diffracted s-polarized portion from the polarization rotator. This activated HOE diffracts the p-polarized portion and passes the diffracted s-polarized with little or no alteration. Accordingly, activated HOEs 321a in each group in combination with the polarization rotator, operate to focus, by diffraction, both the p-polarized and s-polarized portions of the first light component of the first image cross section onto image plane 331. It is noted that the HOEs 321a in each group may differ, for example, in the diffraction gratings recorded therein to account for differences in their position relative to image plane 331 and/or object plane 310. HOEs 321b, and 321c in each group operate similarly to focus both the p-polarized and s-polarized portions of the second and third light components, respectively, of the first image cross section onto image plane 331. It is also noted that all HOEs 321a, 321b, and 321c in each group may be activated while the three color components of the first cross section are sequentially displayed at object plane 310 since HOEs 321a diffract first bandwidth light (e.g., red light) when active while transmitting second and third bandwidth lights (e.g., green and blue lights) with little or no alteration, HOEs 321b diffract second bandwidth light when active while transmitting first and third bandwidth lights with little or no alteration, and HOEs 321c diffract third bandwidth light when active while transmitting first and second bandwidth lights with little or no alteration.

As noted above, each switchable HOE may include an exposed PDLC material. This PDLC material may be sandwiched between a pair of light transparent, electrically conductive indium tin oxide (ITO) layers to which an electric voltage may be applied. In inactive state, an electric voltage is applied to the ITO layers thereby creating an electric field in exposed PDLC. The electric field effectively erases the hologram recorded in the exposed PDLC material so that all light passes therethrough with little or no alteration. In the active state no electric field is applied to the ITO layers, and the exposed PDLC material exhibits very high diffraction efficiency. In this embodiment, each HOE can be individually controlled.

In an alternative arrangement, several HOEs may be arranged between a single pair of ITO layers. Applying a voltage to the ITO layers simultaneously activates the several HOEs in this alternative arrangement. For example, three layers of exposed PDLC material may be sandwiched between a single pair of ITO layers. Each of the three layers of exposed PDLC material may be configured to diffract a distinct bandwidth of light. A first layer of exposed PDLC material may be configured to diffract red bandwidth light, a second layer of exposed PDLC material may be configured to diffract green bandwidth light, and a third layer of exposed PDLC material may be configured to diffract blue bandwidth light.

This alternative arrangement of HOEs is well suited to the embodiment mentioned above where groups of HOEs 321a–c, 322a–c, 323a–c, 324a–c are sequentially activated as color components of image cross sections are presented at display plane 310. For example, HOEs 321a–c, may take form in three separate layers of exposed PDLC material sandwiched between a pair of ITO layers. Without an electric voltage applied to the ITO layers, all three HOEs 321a–c are active. While the three HOEs 321a–321c of this arrangement are active, the three color components of the first image slice can be sequentially displayed at plane 310 and focused onto image plane 331 since each of the HOEs 321a–c diffracts a distinct bandwidth of light when active while transmitting other bandwidths of light with little or no alteration. Each of the groups of HOEs 322a–c, 323a–c, and 324a–c can be arranged and operated similarly.

Instead of cycling through the three color components for a single image plane before switching to another image plane, it is noted that the color components and image planes may be addressed in some other order. For example, holographic optical system 320A may be controlled so that one color component is projected onto all of the image planes before holographic optical system 320A switches to another color component.

Each cycle effectively comprises one frame in a continuous display. It is well known that to achieve a smoothly flowing image, the frames must be updated at a rate equal to or greater than 22 frames per second. Thus, the projection system cycles through imaging the several colors onto the several planes in a time less than or equal to 45 milliseconds. The cycling is preferably performed in substantially shorter time, thereby achieving frame rates of 25, 30, 50, 60, or 72 frames per second.

In one embodiment, optical system 320A includes further HOEs for that enable a variable-focus function. Image volume 330 is located at a particular distance from switchable holographic optical system 320A; this distance depends on the effective focal lengths of HOES in optical system 320A, and on the distance between optical system 320A and display unit 310. In this embodiment, image volume can be set at a chosen location from by selecting HOEs with appropriate focal lengths in optical system 320A. Note that this "zoom" function is thus preferably achieved without any physical movement (translation along an optical axis) of optical system 320A.

Figure 20:
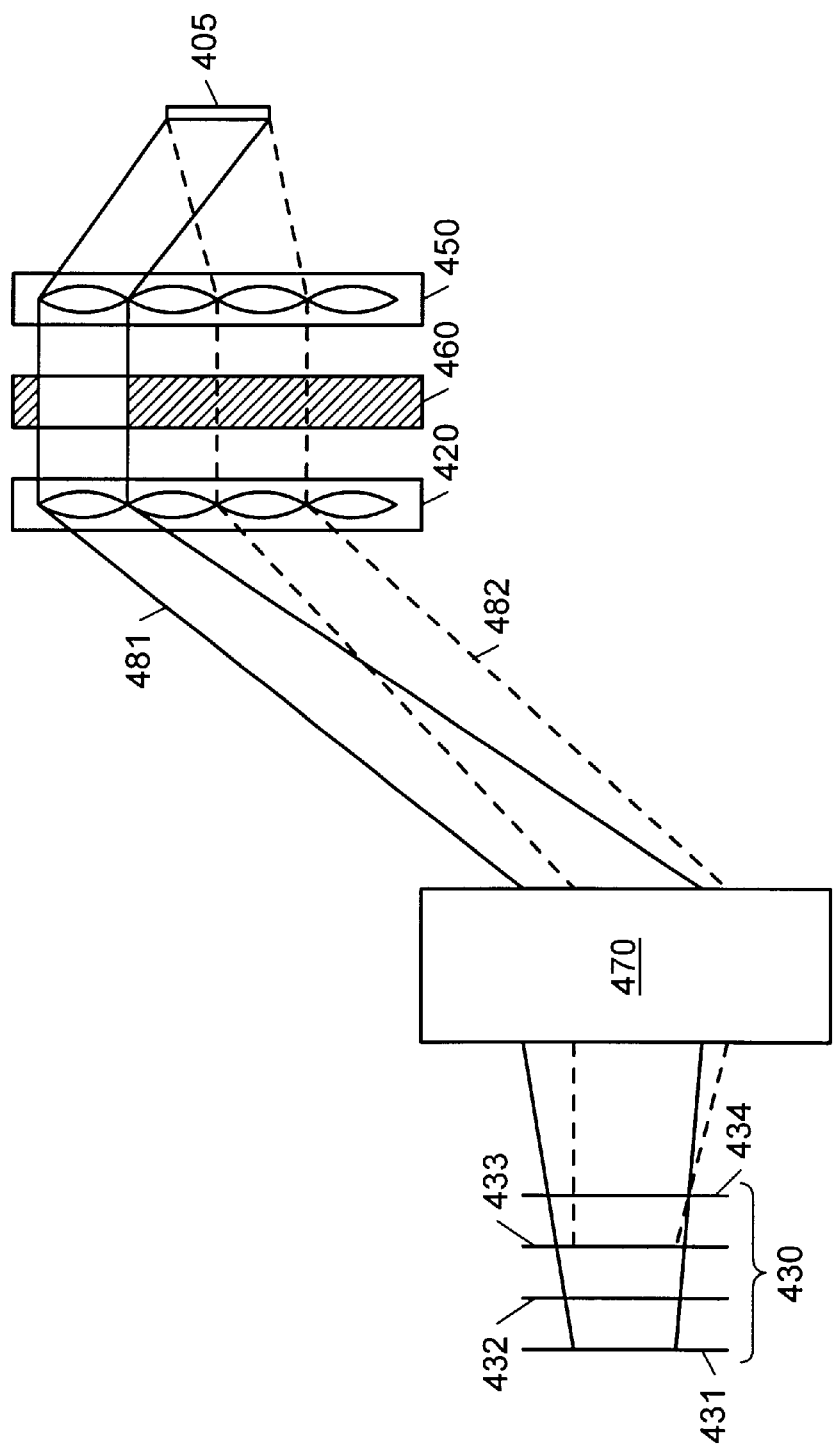
FIG. 20 shows another embodiment of the system that uses an array of switchable holographic optical elements.

FIG. 20: Three-dimensional Projection With a Switchable Holographic Array

Instead of having the switchable HOEs arranged in a stack as shown in FIG. 19, the switchable HOEs may be arranged in a planar array. A system using such a switchable holographic lens array 420 is shown in FIG. 20. The system also includes an LCD display 405, a planar array of conventional lenses 450, shutter array 460, and a combiner lens system 470.

Switchable holographic lens array 420 comprises, in one embodiment, a series of switchable HOEs arranged side-by-side in a plane. In a preferred embodiment, lens array 420 comprises a stack of three switchable HOEs, one for transmitting each of three basis colors (such as RGB or CYM). It is noted that the lens array 420 may comprise a stack of conventional static HOEs (to achieve a monochrome display). However, FIG. 20 will be described with lens array 420 comprising switchable HOEs formed from PDLC material described above.

In this embodiment, light is transmitted through a series of only three switchable HOEs instead of through a larger number required in the embodiments depicted in FIG. 19 and FIG. 20. Thus, the beam path in this embodiment is less susceptible to attenuation and aberrations that may be introduced by the inactive holographic optical elements.

LCD display 405 is preferably a reflective LCD display illuminated by a high-intensity light source (not shown). LCD display 405 is preferably an active display that uses TFT (thin-film transistor) elements to maintain the on/off status of the pixels between each refresh of the screen. LCD display 405 is preferably configured for fast refresh rates, high reflection efficiency, and high contrast. As an alternative to LCD technology, it is possible to use micro-mirror arrays such as the devices manufactured by Texas Instruments, Inc.

LCD display 405 is placed at the object plane of the display system, and is preferably illuminated by one or more bright light sources, such as high-power incoherent sources (incandescent lamps, fluorescent lamps, halogen lamps, induction lamps, or LEDs, among others) or lasers. In a preferred embodiment, LCD display 405 reflects light over a broad range of angles, so the light reflected from LCD display 405 is cast upon the entire lens array 450. Each of the elements or series of three elements in switchable holographic lens array 420 is configured to focus light from LCD display 405 onto one of several planes 431–434 in an image volume 430. As described below, combiner lens system 470 directs the light from different elements in lens array 420 onto the compact image volume 430. Light from LCD display 405 is selectively passed to array 420 via shutter array 460. At any given time, preferably only one beam path, such as that indicated by 481, is open for transmitting light from LCD display 405 to image volume 430. The shutter can rapidly switch so that a different element is unblocked, thereby allowing the light from LCD display 405 to reach image volume 430 by another beam path, such as the one indicated by 482. The HOEs in holographic lens array 420 are constructed with different focal lengths corresponding to the different focal planes in image volume 430. Thus, when shutter array 460 unblocks beam path 481, light from LCD display 405 is focussed onto image plane 431 in image volume 430. When beam path 482 is open, light from LCD display 405 is imaged onto image plane 433.

Combiner lens 470 redirects the different beam paths from lens array 420 so that they overlap in image volume 430. Each beam path selected by shutter array 460 goes through a different lens element in lens array 420. Thus the various beams emerging from lens array 420 do not share a common optical axis. Combiner lens 470 redirects the light coming from different locations on lens array by different amounts so that they emerge from combiner lens 470 on substantially the same optical axis.

In one embodiment, combiner lens 470 is a system of conventional optical elements. Alternatively, combiner lens 470 may be constructed from switchable holographic optical elements, or from a combination of conventional optics and switchable HOEs. Switchable HOEs in combiner lens 470 would preferably be used for correcting chromatic aberrations introduced by holographic lens array 420.

Holographic lens array 420 preferably includes, for example, a stack of separated red-, green-, and blue-sensitive hologram arrays that are switched sequentially at a rate synchronized with the refresh rate of LCD display 405. Likewise, although the HOEs of holographic lens array 420 in FIG. 20 are represented as single lenses, in practice more HOEs may be added in order to optimize the beam characteristics and to correct aberrations. Therefore, preferred embodiments of holographic lens array 420 would have multi-layer configurations in many situations.

The HOEs in holographic lens array 420 are preferably configured so that light reflected from each LCD element of display 405 fills the entire aperture of each HOE. Design considerations for lens array 420 preferably include the efficient collection of light from display 405.

In one embodiment, stacks of arrays are used in holographic lens array 420, further increasing the number of image planes can be generated.

It is also contemplated that shutter array 460 can be replaced by Bragg-type holograms whose angular selectivity perform the same function as the shutter array.

Additional functionality can also be added by incorporating additional hologram layers to perform specific optical operations. For example, in one embodiment of the projection system, holographic lens array 420 includes a hologram stack with elements having different optical powers. This configuration of the lens array provides the system with rapidly switchable variable magnification (zoom).

Figure 21:
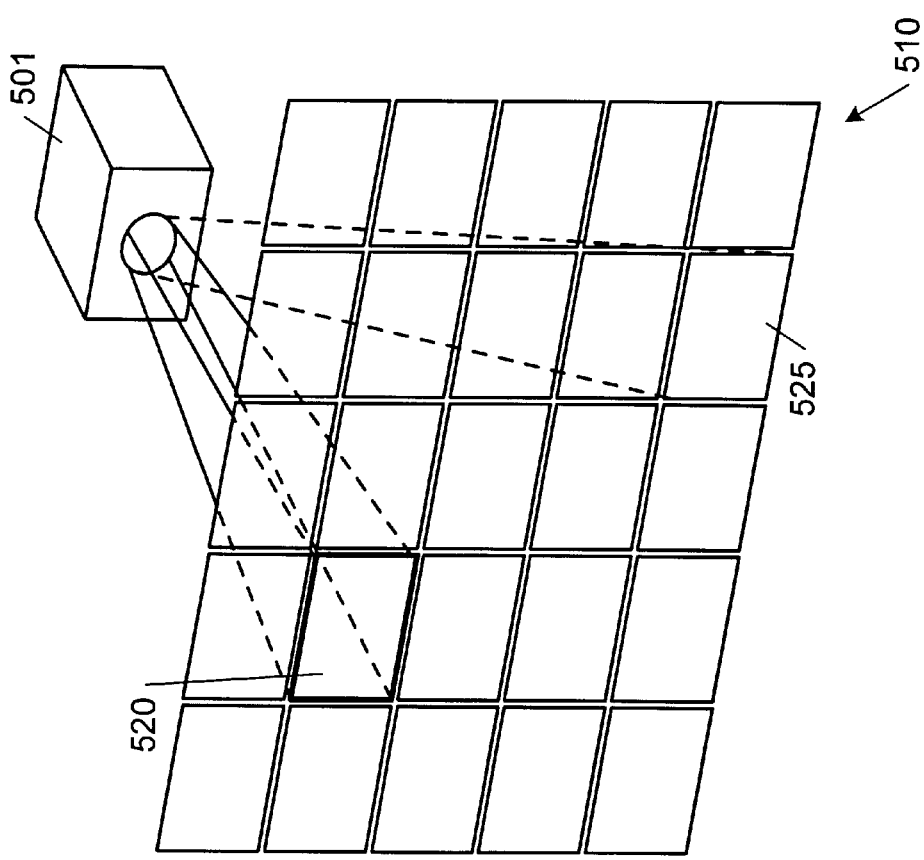
FIG. 21 shows a system for projecting a tiled-array image onto a screen.
Figure 22:
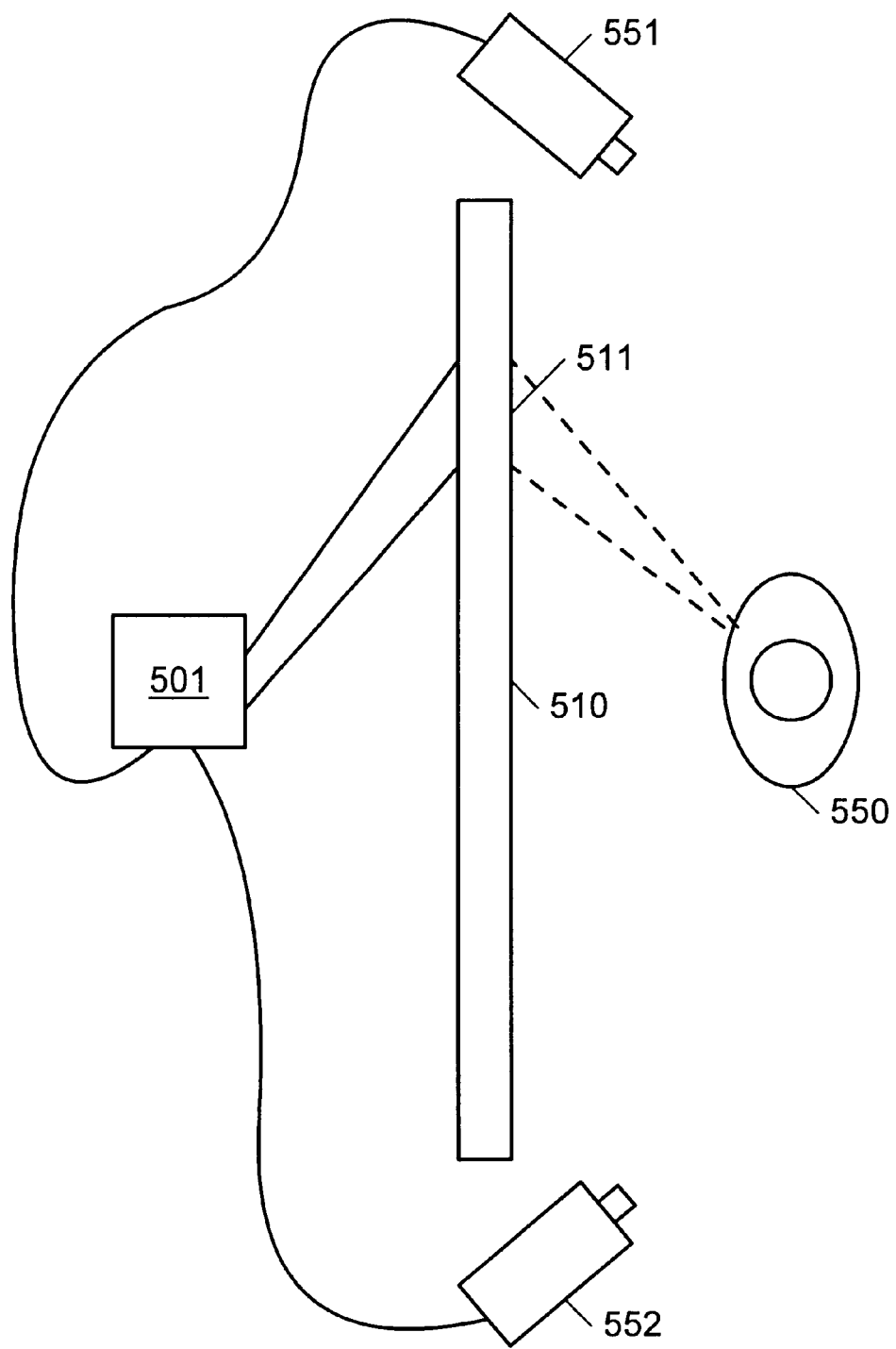
FIG. 22 shows a monitoring system for enhancing the portion of an image in the center of a user's field of view.

FIGS. 21 and 22: Multiple-tiled Images From a Single Projector With Switchable Holographic Elements.

Instead of (or in addition to) using switchable HOEs to direct an image onto several different focal planes, the switchable HOEs may be used to direct an image onto several different regions of a single focal plane. FIG. 21 shows a system that projects a 2-D image onto a flat screen 510. The image is made of an array of image tiles, each of which is projected onto screen 510 by a projector 501.

Projector 501 time-multiplexes its projection angle. It has a display that sequentially generates the images intended for display on the different tiles. The display is preferably a single reflective LCD display, although other types and numbers of displays may also be used. At any single point in time, one or more switchable HOEs in projector 501 focus the display onto a particular image tile 520. The switchable HOEs work in synchrony with the display so that when the display switches to displaying an image for a new tile 525, the switchable HOEs switch to a mode in which they direct the image onto the new tile. By sequencing through the images for all the tiles in a time smaller than the eye integration time, the projector generates an apparently continuous image over the entire screen 510. As discussed earlier, the display and the switchable HOEs must have a sufficiently fast update rate to provide a smooth flicker-free image. The update rate is preferably 25, 30, 50, 60, or 72 frames per second.

The tiling technique may be used to increase the size or the resolution of a display, or both, as shown by the following examples.

In one embodiment of the tiled display, an image from a 1024×768 LCD display is projected onto a 10×10 array of tiles. The focussing optics are configured so that each tile has the dimensions of a 12" video monitor. Thus, the pixel size of the display is comparable to that of a standard video monitor, but the overall size of the display is much larger: a factor of 100 greater in area. This configuration allows the generation of a large viewing area with adequate resolution for viewing at close range.

In another embodiment, a 3×3 array of tiles is generated from an LCD display having a resolution of 800×600 pixels. The 9 tiles are projected onto a 24" monitor, thereby providing a high resolution monitor (2400×1800 pixels) readily usable in a graphics workstation.

Other numbers of tiles and other numbers of pixels in each tile may also be used, as appropriate for a given application. The details of the configuration would depend on the intended viewing distance (which determines the size of the displayed pixels, according to the Rayleigh two-point discrimination criteria) the desired size of the overall screen 510, and the costs and availability of the LCD display, video processing hardware, and projection optics.

In some applications, it may be desirable to use a reduced resolution and/or a reduced update rate for certain portions of the overall screen. For example, when displaying a scene in which most of the motion is restricted to one portion of the screen, one embodiment of the projection system would update the data used for the other tiles less frequently than the data used for the central tiles. While each tile is preferably re-projected once in each frame period, the data used to make up that tile may not be updated for several frame periods if little no motion occurs in that tile. Thus, the motion in the active portion of the screen would appear fluid, and digital video-processing power would not be expended on unnecessarily updating other portions of the screen.

In one embodiment of the projection system, the video-processing power may be reduced by using decreased resolutions in some portions of the screen. One embodiment of such a system is depicted in FIG. 22.

FIG. 22 shows a user 550 who is looking at tiled video screen 510. Video screen 510 is preferably sufficiently large that only a portion 511 of video screen 510 is in the center of the viewer's field of view. A gaze-tracking system, such as one incorporating cameras 551 and 552, monitors the user's head position and/or eye position to determine which part of screen 510 is centered in the user's field of view. This central portion 511 is then projected with high resolution by projector 501, since it is this portion of the screen that is viewed by the fovea, the most sensitive portion of the user's eye. Other regions of screen 510 may be projected with lower resolution to reduce the amount of video-processing power required by the system. Thus, the projection system considers the foveal characteristics of user 550 in determining how to allocate video data processing resources.

Instead of cameras 551 and 552, the gaze-tracking system may use additional layers of HOE optics in projector 501 to perform the optical functions necessary for head tracking. For example, projector 501 may include elements for projecting infrared (IR) radiation (or suitable visible-band light) onto the feature to be tracked and additional elements for imaging the back-scattered IR onto some imaging sensor inside the projector.

While the present invention has been described with reference to particular embodiments, it will be understood that the embodiments are illustrative and that the invention scope is not limited to these particular embodiments. Variations, modifications, additions, and improvements to the embodiments described are possible. These variations, modifications, additions, and improvements may fall within the scope of the invention as detailed by the following claims.

What is claimed is:

1. A method comprising:

sequentially displaying red, blue, and green color components of a first two-dimensional image, wherein the first two dimensional image represents a first slice of a three-dimensional image;

sequentially activating first, second and third switchable holographic optical elements (HOEs) as the red, blue, and green color component of the first two-dimensional image are displayed, wherein the activated first switchable HOE focuses the red color component of the first two-dimensional image onto a first image plane, wherein the activated second switchable HOE focuses the green color component of the first two-dimensional image onto the first image plane, and wherein the activated third switchable HOE focuses the blue color component of the first two-dimensional image onto the first image plane;

sequentially displaying red, blue, and green color components of a second two-dimensional image, wherein the second two dimensional image represents a second slice of the three-dimensional image;

activating a fourth switchable holographic optical element (HOE) as the red color component of the second two-dimensional image is displayed, wherein the activated fourth switchable HOE focuses the red color component of the second two-dimensional image onto a second image plane;

wherein the second image plane is adjacent to the first image plane.

2. A method comprising:

(a) sequentially displaying first, second, and third color components of a first two-dimensional image, wherein the first two dimensional image represents a first slice of a three-dimensional image;

(b) activating first, second and third switchable holographic optical elements (HOEs), wherein the activated first switchable HOE focuses the first color component of the first two-dimensional image onto a first image plane, wherein the activated second switchable HOE focuses the second color component of the first two-dimensional image onto the first image plane, and wherein the wherein the activated third switchable HOE focuses the third color component of the first two-dimensional image onto the first image plane;

(c) deactivating the first, second and third switchable HOEs;

(d) sequentially displaying first, second, and third color components of a second two-dimensional image, wherein the second two dimensional image represents a second slice of the three-dimensional image;

(e) activating a fourth switchable holographic optical element (HOE), wherein the activated fourth switchable HOE focuses the first color component of the second two-dimensional image onto a second image plane;

wherein the second image plane is adjacent to the first image plane.

3. The method of claim 2 wherein the first, second and third switchable HOEs are sequentially activated and deactivated as the first, second, and third color components of the first two-dimensional image are displayed so that only the first switchable HOE is activated while the first color component of the first two-dimensional image is displayed, only the second switchable HOE is activated while the second color component of the first two-dimensional image is displayed, and only the third switchable HOE is activated while the third color component of the first two-dimensional image is displayed image onto the first image plane.

4. The method of claim 2, wherein (a)–(e) are performed within 100 microseconds.

5. The method of claim 2, wherein one of the first, second, or third switchable HOEs comprises a hologram made by exposing an interference pattern inside a polymer-dispersed liquid crystal material, the polymer-dispersed liquid crystal material comprising, before exposure:

a polymerizable monomer;

a liquid crystal;

a cross-linking monomer;

a coinitiator; and a photoinitiator dye.

6. The method of claim 2, wherein one of the first, second, or third switchable HOEs comprises a holographic recording medium that records a hologram, wherein the holographic recording medium comprises:

a monomer dipentaerythritol hydroxypentaacrylate;

a liquid crystal;

a cross-linking monomer;

a coinitiator; and a photoinitiator dye.

7. The method of claim 2, wherein one of the first, second, or third switchable HOEs comprises an exposed polymer dispersed liquid crystal layer.

8. The method of claim 2 wherein the first, second, and third switchable HOEs comprise first, second, and third exposed polymer dispersed liquid crystal layers, wherein the first, second, and third exposed polymer dispersed liquid crystal layers are positioned between a pair of light transparent, electrically conductive layers.

9. The method of claim 2, wherein the three-dimensional image is a static three-dimensional image.

10. The method of claim 2, wherein the three-dimensional image is one of several three-dimensional images that collectively define a moving three-dimensional image.

11. A three-dimensional projection system comprising:

a two-dimensional display configured to sequentially display first, second, and third color components of a first two-dimensional image, wherein the first two dimensional image represents a first slice of a three-dimensional image;

a switchable holographic optical system configured to focus two-dimensional images received from the two-dimensional display onto a sequence of image planes at a plurality of distances from said two-dimensional display, wherein the switchable holographic optical system comprises first, second and third switchable holographic optical elements (HOEs), wherein the first, second and third switchable holographic optical elements operate between active and inactive states, wherein the first switchable HOE, when activated, focuses the first color component of the first two-dimensional image onto a first image plane, wherein the second switchable HOE, when activated, focuses the second color component of the first two-dimensional image onto the first image plane, and wherein the wherein the third switchable HOE, when activated, focuses the third color component of the first two-dimensional image onto the first image plane, wherein the switchable holographic optical system is optically positioned between the two-dimensional display and the first image plane.

12. The three-dimensional projection system of claim 11, wherein said two-dimensional display is a reflective LCD display.

13. The three-dimensional projection system of claim 11, wherein said switchable holographic optical system further comprises a fourth HOE operable between the active and inactive states, wherein the two dimensional display is configured to sequentially display first, second, and third color components of a second two-dimensional image, wherein the second two dimensional image represents a second slice of the three-dimensional image, and wherein the fourth HOE, when active, is configured to focus the first color component of the second two-dimensional image onto a second image plane, wherein the second image plane is adjacent to the first image plane.

14. The three-dimensional projection system of claim 13, wherein the first, second and third switchable HOEs are configured to be sequentially activated and deactivated as the first, second, and third color components of the first two-dimensional image are displayed so that only the first switchable HOE is activated while the first color component of the first two-dimensional image is displayed, only the second switchable HOE is activated while the second color component of the first two-dimensional image is displayed, and only the third switchable HOE is activated while the third color component of the first two-dimensional image is displayed image onto the first image plane.

15. The three-dimensional projection system of claim 11, further comprising a combiner lens disposed between said switchable holographic optical system and said image planes, wherein said combiner lens is configured to direct beams from said switchable holographic optical system onto overlapping positions on the image planes.

16. The three-dimensional projection system of claim 11, wherein one of the first, second, or third switchable HOEs comprises a hologram made by exposing an interference pattern inside a polymer-dispersed liquid crystal material, the polymer-dispersed liquid crystal material comprising, before exposure:

a polymerizable monomer;

a liquid crystal;

a cross-linking monomer;

a coinitiator; and a photoinitiator dye.

17. The three-dimensional projection system of claim 11, wherein one of the first, second, or third switchable HOEs comprises a holographic recording medium that records a hologram, wherein the holographic recording medium comprises:

a monomer dipentaerythritol hydroxypentaacrylate;

a liquid crystal;

a cross-linking monomer;

a coinitiator; and a photoinitiator dye.

18. The three-dimensional projection system of claim 11, wherein one of the first, second, or third switchable HOEs comprises an exposed polymer dispersed liquid crystal layer.

19. The three-dimensional projection system of claim 11 wherein the first, second, and third switchable HOEs comprise first, second, and third exposed polymer dispersed liquid crystal layers, wherein the first, second, and third exposed polymer dispersed liquid crystal layers are positioned between a pair of light transparent, electrically conductive layers.

20. The three-dimensional projection system of claim 11, wherein said switchable holographic optical system comprises:

a stack of sequentially-switched color-specific switchable holographic optical elements (HOEs);

a shutter array; and a lens array configured to collect light from said two-dimensional display.

21. The three-dimensional projection system of claim 20, wherein said stack of sequentially-switched color-specific switchable HOEs comprises the first, second, and third switchable HOEs.

22. The three-dimensional projection system of claim 20, wherein said shutter array comprises a switchable holographic optical element that selectively blocks light transmission through a plurality of areas on said shutter array.

23. The three-dimensional projection system of claim 20, wherein said lens array is a holographic optical element.

24. The three-dimensional projection system of claim 20, wherein the first, second, and third switchable HOEs comprise a red-transmissive switchable HOE, a green-transmissive switchable HOE, and a blue-transmissive switchable HOE, respectively.

* * * * *